United States Patent [19]

Lebowsky

[11] Patent Number: 5,446,502

[45] Date of Patent: Aug. 29, 1995

[54] METHOD AND APPARATUS FOR FILTERING SIGNALS HAVING A FILTER IN WHICH SIGNAL AMPLITUDES ARE ALLOCATED TO A QUANTIZED, TWO-DIMENSIONAL REFERENCE PLANE

[75] Inventor: Fritz Lebowsky, Freiburg, Germany

[73] Assignee: Linotype-Hell AG, Eschborn, Germany

[21] Appl. No.: 107,797

[22] PCT Filed: Feb. 8, 1992

[86] PCT No.: PCT/DE92/00086

§ 371 Date: Dec. 6, 1993

§ 102(e) Date: Dec. 6, 1993

[87] PCT Pub. No.: WO92/15171

PCT Pub. Date: Sep. 3, 1992

[30] Foreign Application Priority Data

Feb. 22, 1991 [DE] Germany .......... 41 05 516.0

[51] Int. Cl.⁶ .......... H04N 5/208; H04N 5/14
[52] U.S. Cl. .......... 348/625; 348/607; 348/618; 348/622
[58] Field of Search .......... 348/618, 622, 607, 625; H04N 5/14, 208, 213, 221

[56] References Cited

U.S. PATENT DOCUMENTS

| | | | |
|---|---|---|---|
| 3,780,215 | 12/1973 | Shibata et al. | 348/622 |
| 4,213,150 | 7/1980 | Robinson et al. | 358/166 |
| 4,446,484 | 5/1984 | Powell | 358/166 |
| 4,463,381 | 7/1984 | Powell et al. | 358/166 |
| 4,504,863 | 3/1985 | Lacoste | 358/167 |
| 4,633,303 | 12/1986 | Nagasaki et al. | 358/98 |
| 4,825,297 | 4/1989 | Fuchsberger et al. | 358/284 |
| 4,843,472 | 6/1989 | Shimada | 348/625 |
| 4,847,682 | 7/1989 | Tsinberg et al. | 358/31 |
| 4,882,627 | 11/1989 | Keesen et al. | 358/166 |
| 4,916,542 | 4/1990 | Yoneda et al. | 348/622 |
| 4,926,361 | 5/1990 | Ohtsubo et al. | 364/574 |
| 4,962,426 | 10/1990 | Naoi et al. | 358/167 |
| 4,979,023 | 12/1990 | Tsinberg et al. | 358/31 |
| 5,005,081 | 4/1991 | Asano | 348/622 |

FOREIGN PATENT DOCUMENTS

| | | | |
|---|---|---|---|
| 3137989A1 | 3/1983 | Germany | H03H 11/04 |
| 3837329A1 | 5/1990 | Germany | H04N 7/13 |
| 2195857 | 4/1988 | United Kingdom | H04N 1/40 |

OTHER PUBLICATIONS

IEEE Transactions on Circuits and Systems, vol. CAS-34, No. 11, Nov., 1987, Reinhard Bernstein "Adaptive Nonlinear Filters for Simultaneous Removal of Different Kinds of Noise in Images".

Electronics and Communications in Japan, Part 1, vol. 71, No. 10, 1988, Yasuhiro Kawazoe, "Edge Extraction and Restoration of Noisy Image by Innovation Process in Kalman Filter".

Primary Examiner—James J. Groody
Assistant Examiner—Glenton B. Burgess
Attorney, Agent, or Firm—Hill, Steadman & Simpson

[57] ABSTRACT

A method and apparatus serves for filtering signals, whereby signal amplitudes can be allocated to a quantized, two-dimensional reference plane. For intensifying a useful signal part, a filtered signal can be added to an unfiltered input signal after constant parts as well as high-frequency parts have been filtered out. After a frequency-dependent filtering of the signal part to be filtered, components of the signal part to be filtered which have an amplitude above a prescribable threshold are eliminated in at least one contour filter stage. The threshold is adaptively adjusted dependent on an amplitude of the input signal. Over and above this, the output signal of the contour filter stage is subtracted from the output signal of the frequency-dependent filter for generating the overall filter signal.

28 Claims, 10 Drawing Sheets

METHOD AND APPARATUS FOR FILTERING SIGNALS HAVING A FILTER IN WHICH SIGNAL AMPLITUDES ARE ALLOCATED TO A QUANTIZED, TWO-DIMENSIONAL REFERENCE PLANE

BACKGROUND OF THE INVENTION

The invention is directed to a method for filtering signals, whereby signal amplitudes can be allocated to a quantized, two-dimensional reference plane, and whereby a filtered signal can be added to an unfiltered input signal for the amplification of a useful signal part after constant parts as well as high-frequency parts have been filtered out.

Over and above this, the invention is directed to an apparatus for filtering signals, whereby signal amplitudes can be allocated to a quantized, two-dimensional reference plane, and whereby a separating filter that branches the input signal as well as a frequency-dependent filter arranged in a filter branch are provided.

Such devices are particularly employed in electronic imaging processing apparatus in order to improve the image quality of images. Such image graduations particularly occur in the field of digital image processing and are improved with respect to their confidence capability with the assistance of the filter means. For example, EP-B-0 051 068 discloses a filter means of the prior art. It turns out, however, that the known filtering methods and filter devices do not supply satisfactory results particularly when the amplitude of the useful signal is not clearly higher than the amplitude of superimposed disturbances. The result of this is that signals having a low signal-to-noise ratio can only be inadequately filtered. Given, for example, image signals that are only weakly formed, such as comparatively regular textures on a surface, then, even given comparatively slight disturbances, it is not possible with the traditional methods to undertake an adequately sharp demarcation of the contours that limit the texture elements.

SUMMARY OF THE INVENTION

It is therefore an object of the present invention to improve a method of the species initially cited such that a qualitatively high-grade filtering of signals having low signal-to-noise ratio is enabled.

This object is inventively achieved in that, following a frequency filtering of the signal part to be filtered, components of the signal part to be filtered which have an amplitude above a prescribable threshold are eliminated in at least one contour filter unit. The threshold is adaptively adjusted dependent on an amplitude of the input signal. Before offering an overall filter signal, the output signal of the contour filter unit is subtracted from the output signal of the frequency filter in order to generate the overall filter signal.

A further object of the present invention is to improve an apparatus of the type initially cited such that it is suitable for the implementation of the method of the invention.

This object is inventively achieved in that the frequency-dependent filter is provided with at least one lower limit frequency. The output signal of the filter is branched in the region of a separating filter and is supplied both to at least one contour filter that eliminates contour signal parts as well as to a subtraction unit in whose region the output signal of the contour filter is subtracted from the output signal of the filter in order to eliminate noise.

It becomes possible with the assistance of the method of the invention to implement a nearly arbitrarily precise detection of a noise part on the basis of a cascading of contour filter units. By contrast to the methods known from the prior art, it is not exclusively a reduction of noise parts that is implemented here in a filter branch; rather, conversely, an elimination of contour parts from a signal part to be filtered is implemented first in a lower-ranking filter level. The goal of this lower-ranking filter level is to offer a signal that, insofar as possible, contains no contour information and as a result whereof no diminishment of the contour information occurs in a subtraction of the output signal of the filter preferably designed as a high-pass filter. This filtering method makes it possible to intensify even extremely weak contours in an input signal provided with considerable disturbances. In particular, it is possible to intensify contour information whose allocated amplitudes are lower than noise parts mixed with the contour information. Even, for example, in the region of a backing with pronounced textures having low intensity, these can thus be intensified within a noise-infested signal in a processing of image information. This intensification can be implemented without information about a content of the input signal. By contrast to image recognition methods wherein what is sought must at least be known, a locating of unknown contour information can thus ensue on the basis of this method.

In a preferred embodiment of the invention, it is proposed that contours of different intensity are successively eliminated in the region of the lower-ranking filter level. This cascading has the advantage that the dimensioning of the filter elements employed in every stage can be adapted to the noise part that becomes higher and higher in a signal flow direction with reference to the intensity of remaining contours.

It is proposed in another preferred embodiment of the invention that at least one anisotropic low-pass filter that comprises a prescribable orientation and length for the detection of contour parts is arranged in at least one of the contour filter stages. The employment of anisotropic low-pass filters has the advantage that it is not only an amplitude of an information allocated to a specific coordinate that is evaluated for the recognition of a contour but that the fact is exploited that contours are characterized by amplitude curves joined to one another in the direction of a specific course within the reference plane. Disturbances, by contrast, essentially arise according to statistical distributions. It is therefore expedient for locating weak contours to employ anisotropic low-pass filters with which many comparative coordinates within the reference plane are evaluated.

It is proposed in another preferred embodiment of the invention that at least two stage elements to which anisotropic low-pass filters having different orientations within the reference plane are allocated are arranged within a contour filter stage. This arrangement of differently oriented, anisotropic low-pass filters within a contour filter stage makes it possible to be able to implement a locating of contours of preselectable intensity with high reliability in each of the contour filter levels. This enables an optimum dimensioning of a following contour filter stage, since there is high probability that contours above a specific intensity are no longer to be anticipated in the following stage.

It is provided in another preferred embodiment of the invention that an elimination of isolated signal parts within the reference plane occurs in that the signal amplitudes allocated to the corresponding coordinates are set to a value equal to zero. This allocation of the value zero has the advantage that inquiries to be implemented in a following digital processing can be implemented with extremely low computational expense. A high processing speed is achieved as a result thereof, this allowing extremely high transmission rates, particularly given an employment of the apparatus in the domain of equipment of image reproduction technology or in the domain of telecommunications. There is a high probability that isolated amplitudes are allocated to disturbances having high intensity.

Further details of the present invention derive from the following, detailed specification and from the attached drawings wherein preferred embodiments of the invention are shown by way of example.

DESCRIPTION OF THE PREFERRED EMBODIMENTS

Figure 12:
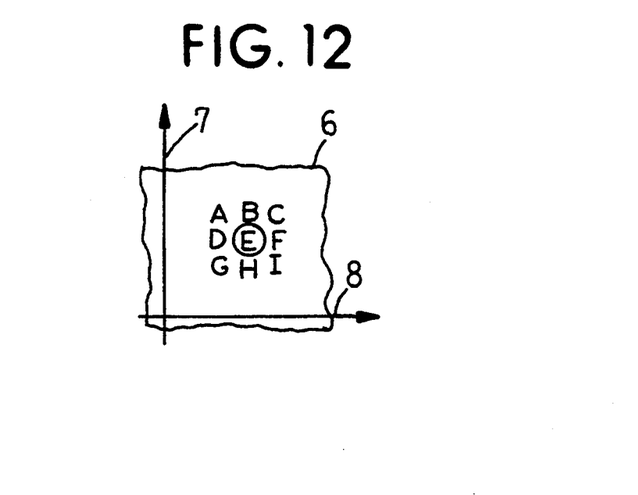
FIG. 12 is a schematic illustration of amplitude values that are allocated to coordinates of a rastered level.

An apparatus for filtering signals is essentially composed of a separating filter 1 in which an input signal present at an input 2 is branched into a through branch 3 as well as into a filter branch 4. The part of the input signal conducted into the filter branch 4 is first supplied to a high-pass filter 5 that has a two-dimensional functioning. As a consequence of the two-dimensional functioning of the high-pass filter, localizible picture elements with their allocated amplitude values can be taken into consideration in the high-pass filtering within a quantized reference plane 6 with respect to the path of coordinate axes 7, 8. Fundamentally, a band-pass filter can also be employed instead of the high-pass filter 5. A fundamental arrangement of picture elements allocated to the coordinate axes 7, 8 in the reference plane 6 is shown in FIG. 12. It may be seen from the block circuit structure of the apparatus shown in FIG. 1 that a notch diplexer 9 is arranged following the high-pass filter 5 in a signal flow direction, the signal departing the high-pass filter 5 being divided therein into a coupling branch 10 as well as into a contour filter branch 11. Contour filter stages 12 wherein contour parts are detected and are eliminated from the signal part forwarded via the contour filter branch 11 are arranged within the contour filter branch 11. Dependent on the filtering quality to be achieved, it is possible to employ only one contour filter stage 12 or a series circuit of contour filter stages 12. Given a series circuit of contour filter stages 12, it is expedient to initially eliminate intense contours and, subsequently, more weakly pronounced contours in the direction of the signal flow.

Figure 1:
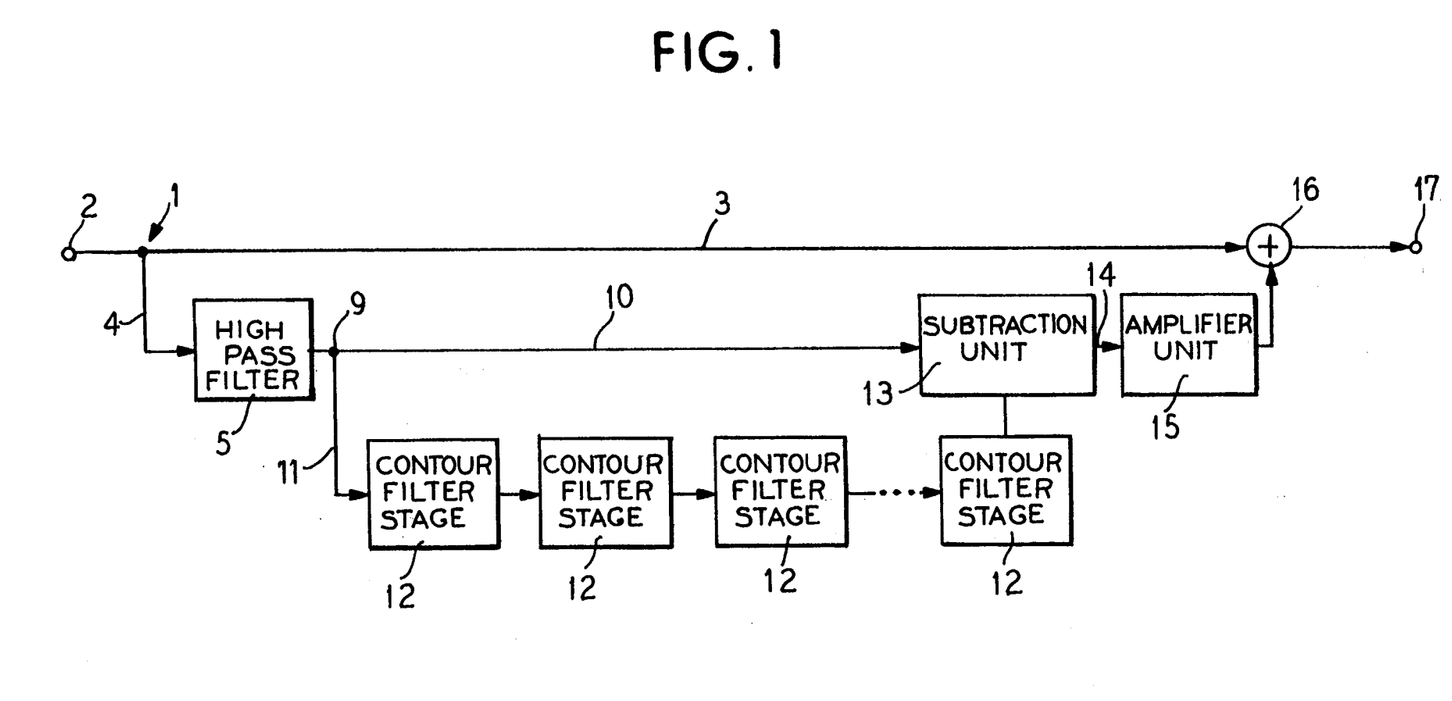
FIG. 1 is a block circuit diagram for illustrating the fundamental sequence of the filtering method.

The signal departing the contour filter branch 11 is subtracted in a subtraction unit 13 from the signal part forwarded via the coupling branch 10. A contour signal largely freed of noise parts is thus available at an output 14 of the subtraction unit 13. This signal is amplified in an amplifier unit 15 and is subsequently added in a combiner or adder 16 to the part of the input signal forwarded via the through branch 3. A signal that can be taken at an output 17 and that has a significantly higher signal-to-noise ratio than the signal present at the input 2 arises as a result thereof.

A selector can be connected between the output 14 and the amplifier unit 15, allocated isolated signal 10 amplitudes within the reference plane being eliminated with the assistance of this selector. Coordinates within the reference plane 6 to which an amplitude unequal to zero is allocated, even though no amplitude values unequal to zero were allocated to the coordinates in an immediate environment of these working coordinates, have a high probability of resulting from disturbances and are not allocated to a useful signal part. The assistance of the selector makes it possible to filter such disturbances out. The value zero or, respectively, at least a value that does not substantially deviate from zero is allocated to the coordinates that are thereby located.

Figure 13:
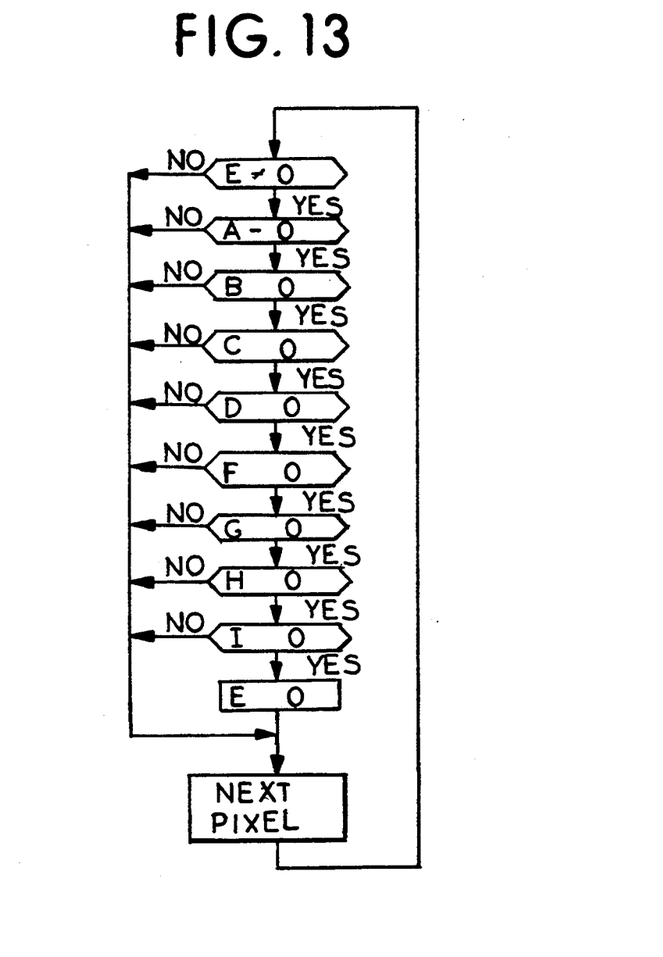
FIG. 13 is a flowchart regarding the elimination of isolated signal parts.

An example of the sequence of the selection process in an amplitude allocation within the reference plane 6 according to FIG. 12 is shown in FIG. 13. A check is first carried out for the coordinate E to see whether it has a value unequal to zero. When this is not the case, then a check of the next picture element can immediately occur. When an amplitude unequal to zero is allocated to the coordinate E, then the coordinates in its immediate environment are successively checked until an amplitude value unequal to zero has been found. When such an amplitude value is located, the next picture element is likewise analyzed. When all coordinates in the immediate environment of the coordinate E have the amplitude value zero, then the amplitude allocated to the coordinate E is set to zero. In the check of a next picture element, it is fundamentally possible to take information with respect to the amplitude values of specific coordinates acquired within a preceding cycle into consideration. As a consequence of the check to a value equal to zero or, respectively, a value unequal to zero to be implemented with extremely little expenditure of time in a digital realization, however, the sequence illustrated in FIG. 13 can also be run for every individual picture element with extremely little expenditure of time.

Figure 2:
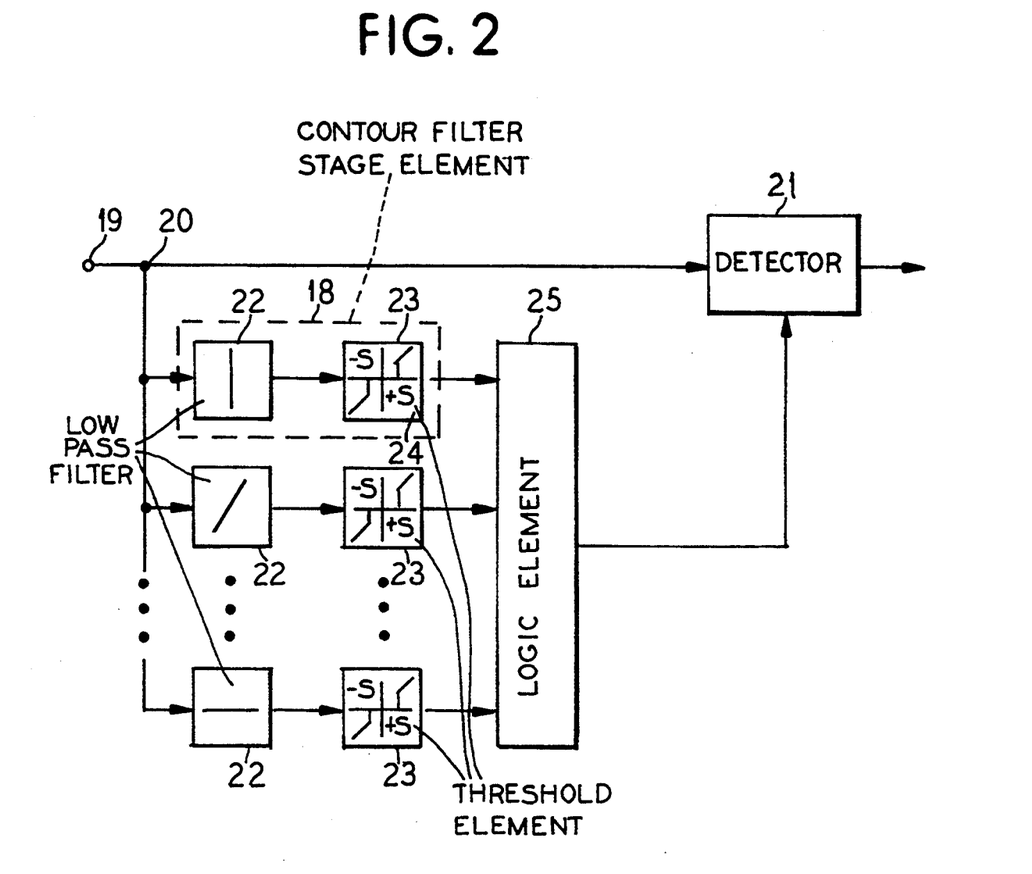
FIG. 2 is a block circuit diagram illustration of a contour filter stage having stage elements connected in parallel.

The illustration of FIG. 2 shows the structure of a contour filter stage 12 having stage elements 18 connected in parallel. The signal to be filtered is conducted to a filter stage input 19 and, in a filter branching 20, is supplied to the stage elements 18 on the one hand and to a detector 21 on the other hand. Each of the stage elements 18 is composed of an anisotropic low-pass filter 22 and of a threshold element 23. The assistance of the threshold elements 23 makes it possible to eliminate signal parts below a prescribable threshold 24 and to allow signal parts above the threshold 24 to pass unmodified or to multiple them by a gain factor. In particular, it has been envisioned to provide thresholds 24 that are identical in amount for positive and negative amplitudes. The anisotropic low-pass filter 22 has a filter orientation within the reference plane 6. For example, a simply constructed, anisotropic low-pass filter 22 is oriented in the direction of one of the coordinate axes 7, 8 and evaluates regions within the reference plane 6 that have a width of, preferably, one quantization stage and a length amounting to a prescribable number of quantization stages. For example, three or five quantization stages can be employed as a length for simple low-pass filters 22. In addition to an orientation in the direction of one of the coordinate axes 7, 8, however, it is also possible to provide any other desired orientations of the low-pass filter 22 in order to locate obliquely proceeding contours. The outputs of the threshold elements 23 are connected to a logic element 25 in which a logical OR operation is implemented. The output of the logic element 25 is connected to the detector 21 wherein the signal offered by the logic element 25 is subtracted from the signal supplied via the filter stage input 19. An elimination of the contours identified in the region of the stage elements 18 thus ensues.

Figure 3:
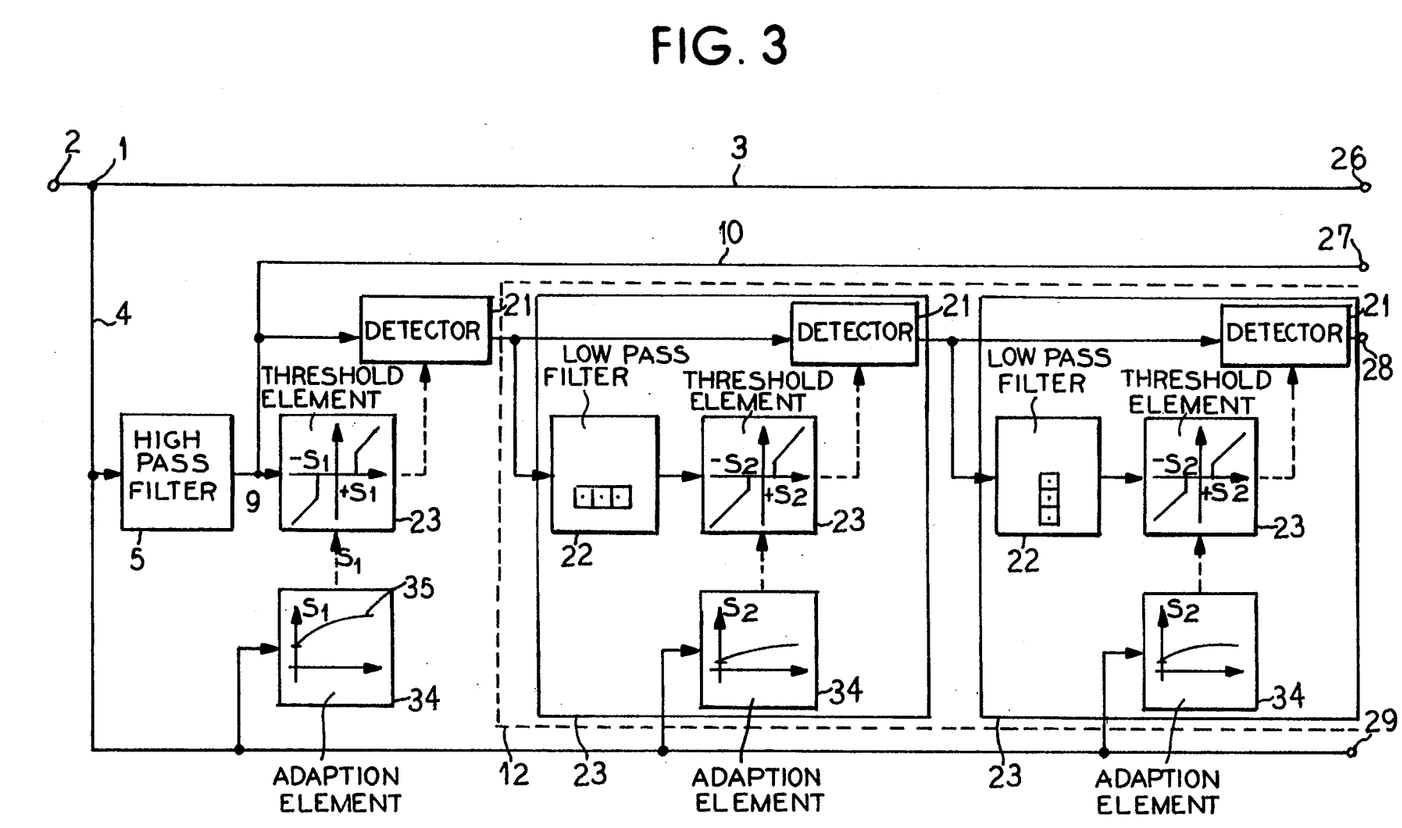
FIG. 3 is a partial block circuit diagram illustration of an apparatus having cascaded contour filter stages.

FIG. 3 shows a detailed circuit of components for realizing a cascaded filter in the region of an input stage. Together with the circuits of FIG. 4 and FIG. 5, the circuit of FIG. 3 yields the overall circuit of the filter. The components of the filter stage according to FIG. 3 are connected via terminals 26, 27, 28, 29 to the components of FIG. 4, and the components of FIG. 4 are connected via the terminals 30, 31, 32, 33 to the components of FIG. 5.

The signal supplied to the first contour filter stage 12 via the notch diplexer 9 is charged with a level-adaptive threshold characteristic in the threshold element 23. An adaptation element 34, in which an adaptation characteristic 35 is implemented, is provided for the calculation of the threshold 24. The threshold 24 is preferably symmetrically prescribed with the assistance of the adaptation characteristic 35 for positive and negative amplitude parts of the signal to be filtered. For this purpose, the input signal present at the input 2 is supplied to the adaptation element 34 and the respective threshold 24 is calculated via the adaptation characteristic 34 dependent on the current amplitude of this input signal. For an amplitude of the input signal equal to zero, the threshold 24 has a minimum value and the adaptation characteristic 35 extends—proceeding from this minimum threshold—in a parameter plane that is erected by a threshold axis and an amplitude axis, preferably with decreasing slope. The curve of the adaptation characteristic is preferably proportional to the level-dependent curve of the signal-to-noise ratio of the input signal 2 to be filtered. This threshold characteristic is defined dependent on the signal-to-noise ratio of the signal to be filtered, dependent on a quantization unit that has been undertaken or dependent on other, known information with respect to the signal to be filtered. Different threshold characteristics and adaptation characteristics 35 can be employed for defining the thresholds 24 of different contour filter stages 12.

Four threshold elements 23 whose anisotropic low-pass filters 22 each have respectively different orientations are connected in series in a following filter stage 12. The anisotropic low-pass filters 22 employed here each respectively have a filter width of one quantization stage and a filter length of three quantization stages. These low-pass filters are thus particularly suited for locating rough contours, i.e. contours having comparatively high signal amplitudes. The thresholds 24 of the threshold elements 23 are preferably selected the same within the stage elements 18 forming an amplifier unit 15.

Figure 4:
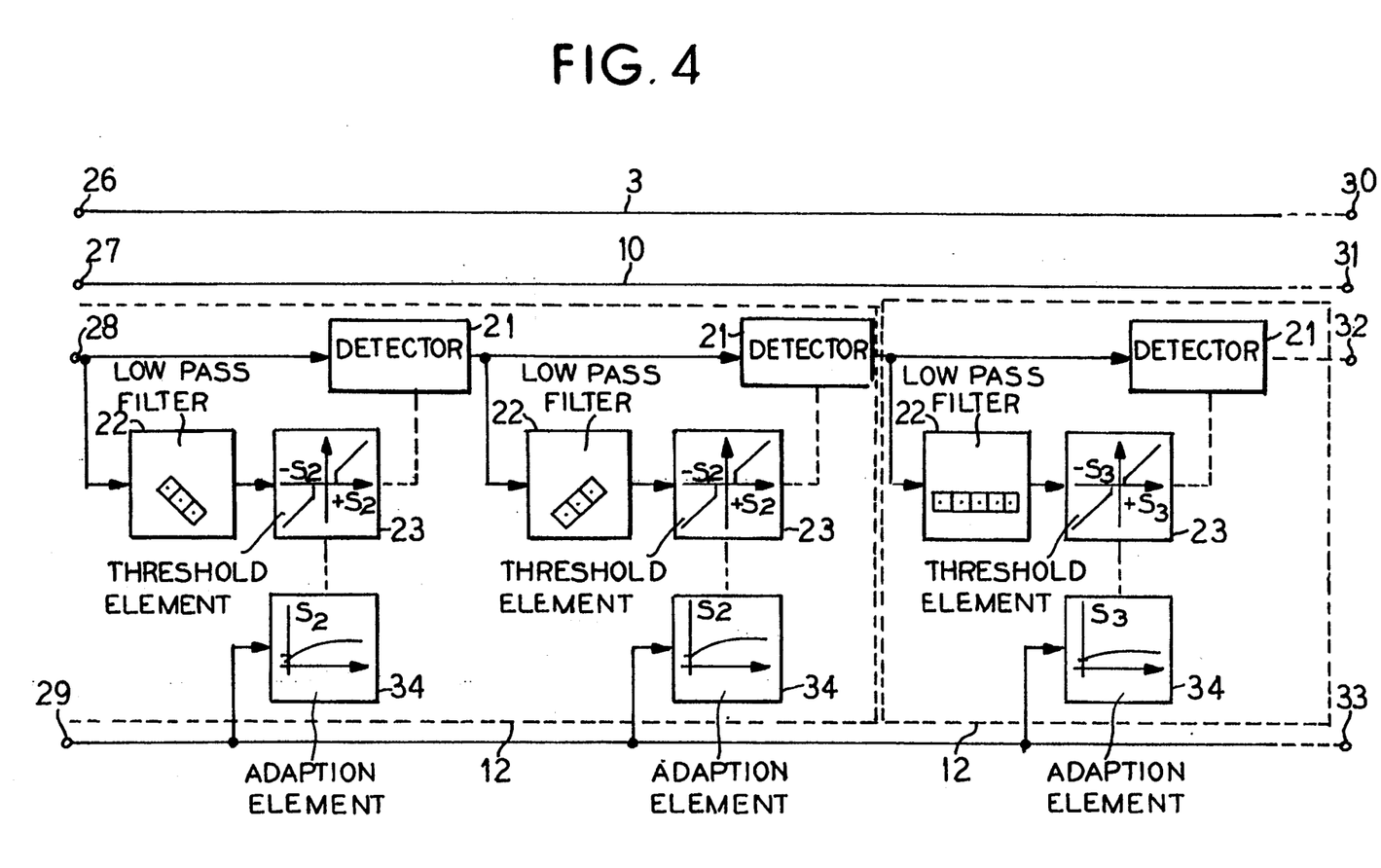
FIG. 4 is an illustration of another area of the apparatus having cascaded contour filter stages.

The illustration of FIG. 4 shows two further stage elements 18 that form the second contour filter stage 12, these being connected in series with the first two stage elements 18 shown in FIG. 3. The output signal of the fourth stage element 18 is supplied to the input of a further contour filter stage 12. For locating finer contours, the third contour filter stage 12 comprises anisotropic low-pass filters 22 having a longer fashioning. In FIG. 4, an anisotropic low-pass filter 22 having a filter width of one quantization stage and a filter length of five quantization stages is shown for the third contour filter stage.

Figure 5:
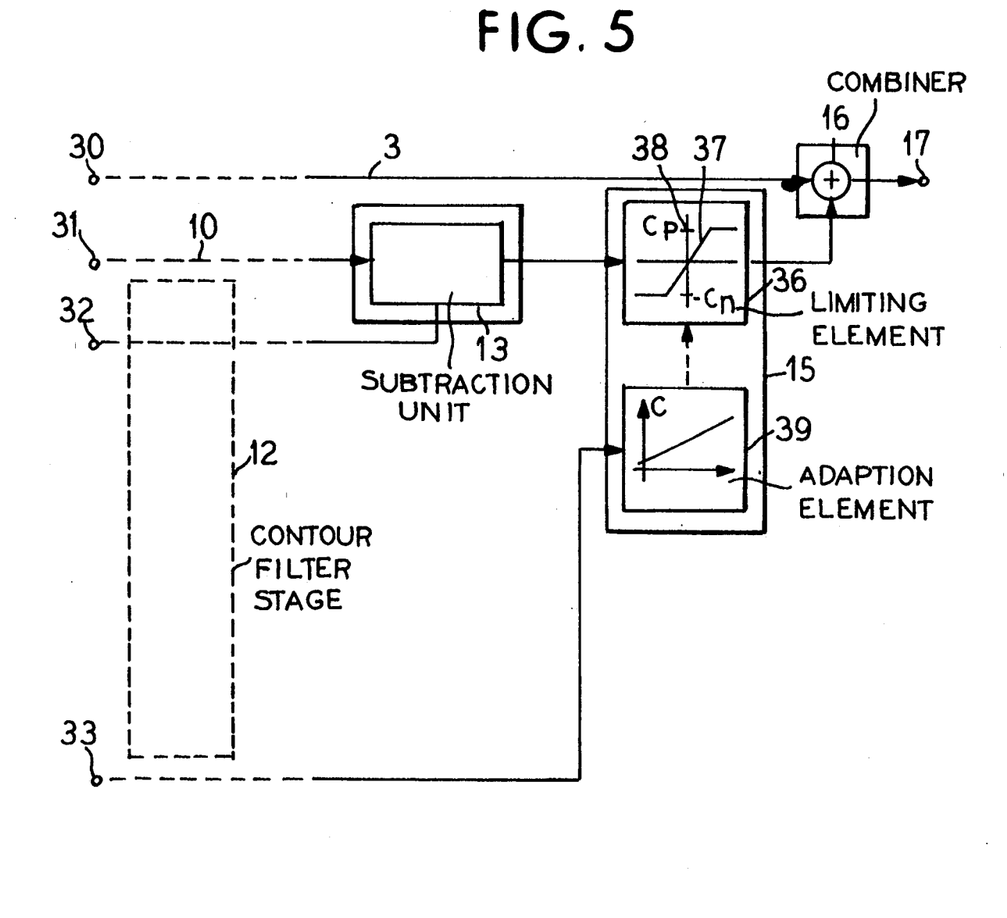
FIG. 5 is an illustration of the apparatus having cascaded contour filter stages in the region of an output.

According to FIG. 4, further contour filter stages 12 can follow upon the third contour filter stage 12. The output signal of the last filter stage 12 in signal flow direction is supplied to the subtraction unit 13 and is subtracted therein from the signal part supplied via the coupling branch 10. The amplifier unit 15 in the embodiment of FIG. 5 is provided with a limiting element 36 wherein a gain characteristic 37 is implemented and wherein a maximum output value 38 is defined via an adaptation element 39 that adjusts the maximum output value 38 dependent on the amplitude of the input signal at the input 2. The adaptation element 38, for example, can have a linear characteristic that leads to a symmetrical prescription of the maximum output value 38 for positive and negative amplitude values. The characteristic of the adaptation element 39 can be essentially linearly designed and operate the maximum output value 38 linearly with the amplitude of the input signal. The implementation of an offset for the gain characteristic 37 is expedient.

The output of the limiting element 36 is connected to the combiner 16 wherein the output signal of the limiting element 36 is added to the input signal.

Figure 6:
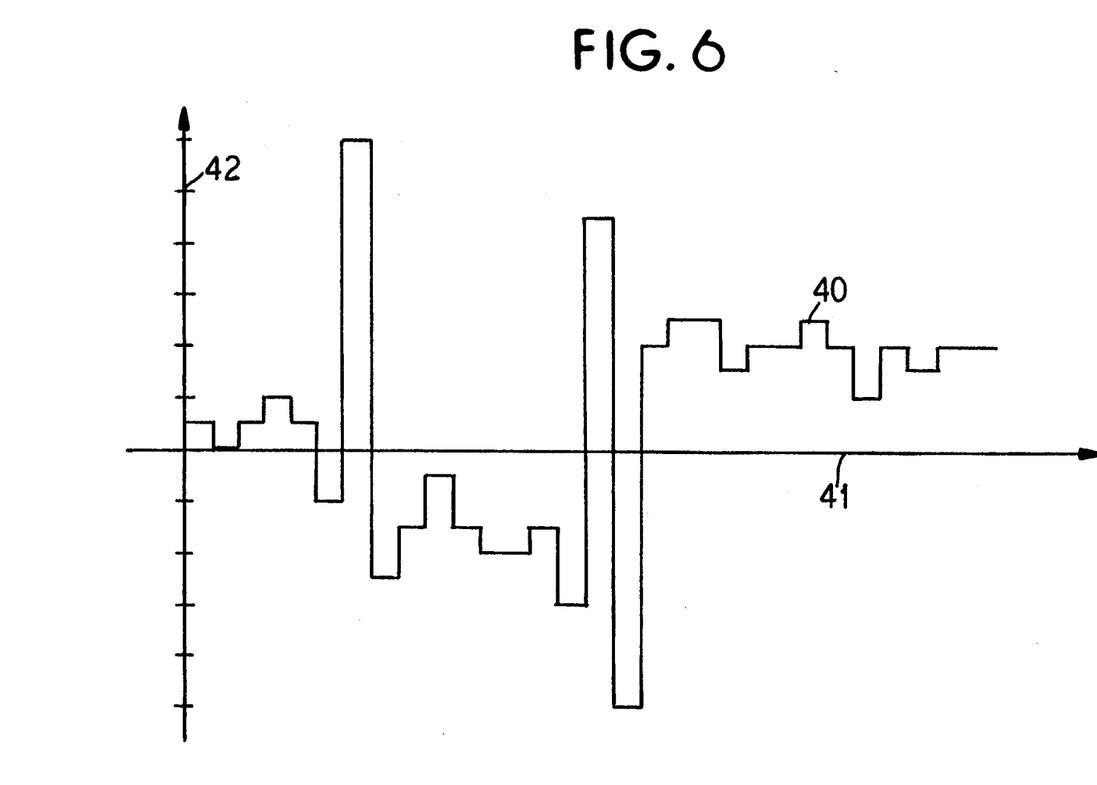
FIG. 6 is a simplified, one-dimensional illustration of a signal curve in the region of an input.
Figure 7:
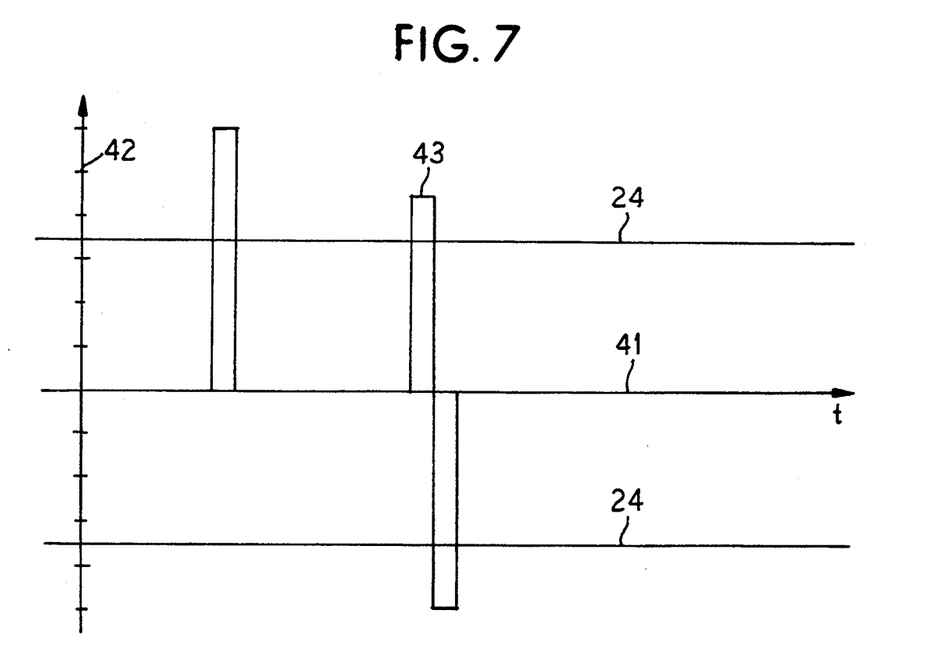
FIG. 7 is an illustration of a contour with allocated, high signal amplitudes detected in the signal curve of FIG. 6.

FIG. 6 shows a typical signal curve 40 at the output of the high-pass filter 5 with respect to a time axis 41 and an amplitude axis 42. FIG. 7 shows the output signal 43 of the threshold element 23 of the first contour filter stage 12 and FIG. 8 shows the output signal 44 identified after a subtraction implemented in the detector 21 of the output signal 43 of the threshold element 23 from the output signal 40 of the high-pass filter 5.

Figure 8:
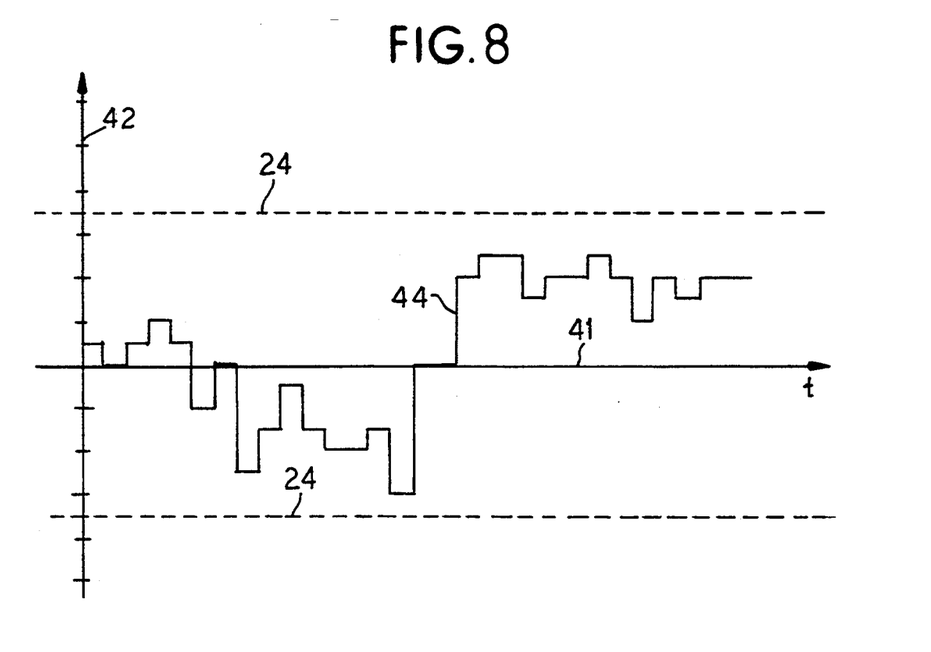
FIG. 8 is an illustration of the signal curve of FIG. 6 after an elimination of the contour identified according to FIG. 7.
Figure 9:
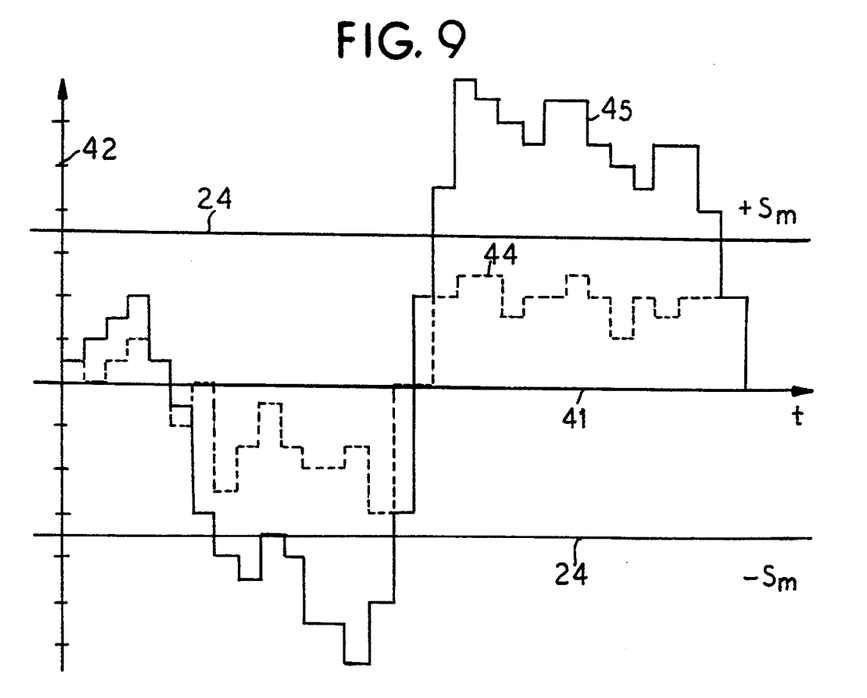
FIG. 9 is a curve of the signal of FIG. 8 filtered via a low-pass filter given a low-pass filter for the evaluation of three neighboring coordinates.
Figure 10:
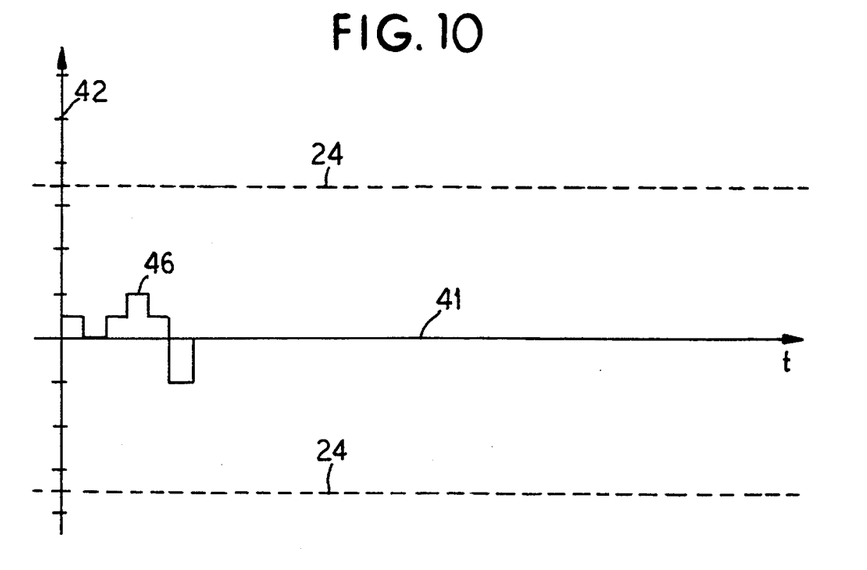
FIG. 10 is a vestigial signal of the signal curve of FIG. 9 taking the thresholds entered in FIG. 9 into consideration.

FIG. 9 shows the signal from FIG. 8 filtered with the assistance of a low-pass filter having a corresponding gain factor. An anisotropic low-pass filter 22 having a filter width of one quantization stage and a filter length of three quantization stages was employed for this purpose. The output signal 45 produced as a result thereof therefore has a higher amplitude and a different dynamics than the output signal 43. Taking the threshold 24 entered in FIG. 9 into consideration, the output signal 46 shown in FIG. 10 derives after a contour elimination.

Figure 11:
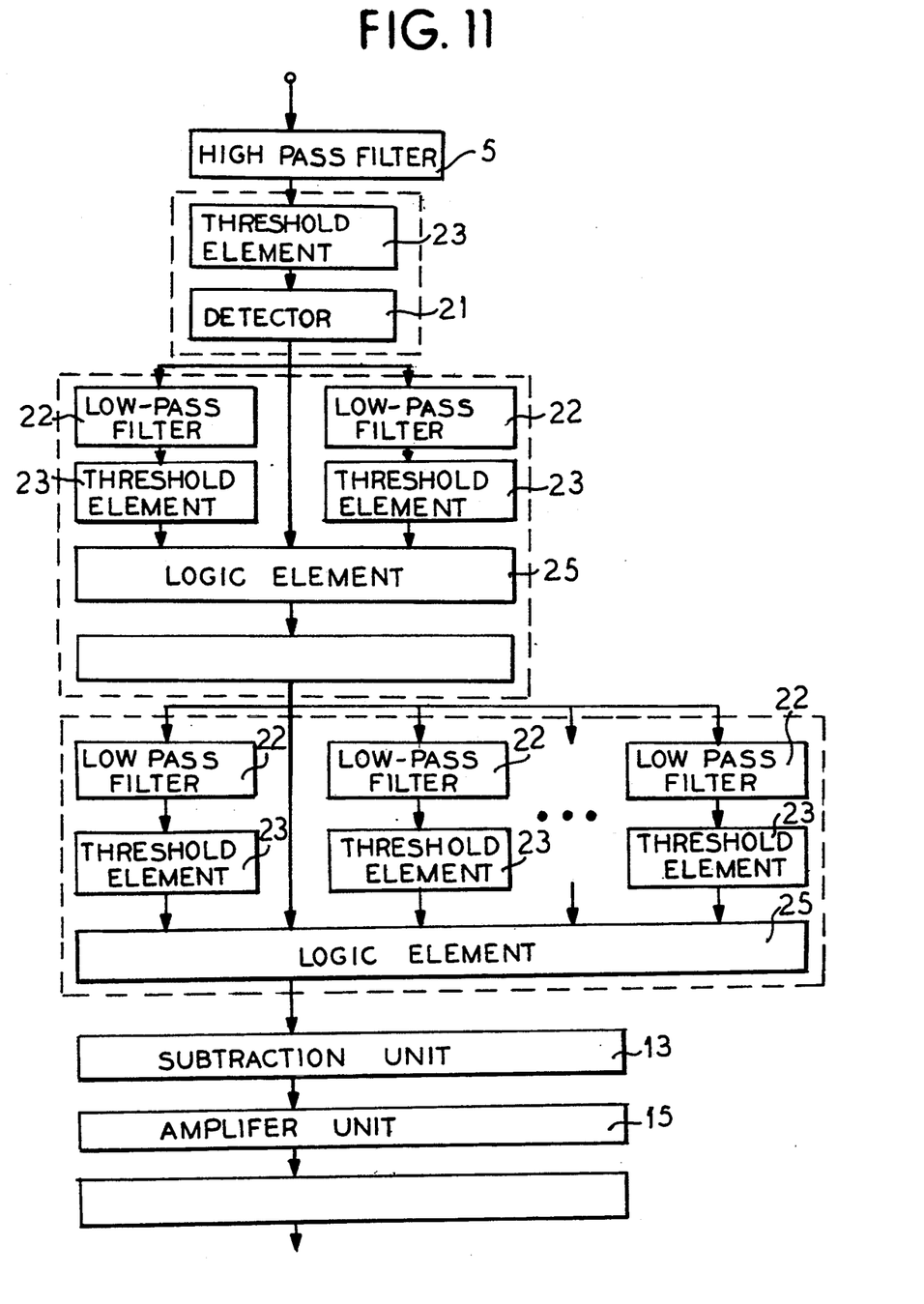
FIG. 11 is a fundamental flowchart of an algorithm for the implementation of the filter method with the assistance of a digital computer.

FIG. 11 shows a basic flowchart for a realization of critical parts of the sequence as a digital computer program. The respective software modules were provided here with the same reference numerals as the allocated circuit elements in FIGS. 3 through 5. An input signal is first filtered via a software module for simulating the high-pass filter 5 and is subsequently supplied to the threshold element 23 provided with an adaptive threshold characteristic. A reduction of the contour signal in the region of the detected contour subsequently ensues via a module for simulating the detector 21. In the embodiment shown in FIG. 11, two anisotropic low-pass filters 22 that, for example, have orientations in the direction of the coordinate axes 7, 8 are provided in a following filter stage. The output values of the anisotropic low-pass filters 22 are subsequently in turn supplied to modules for simulating the adaptive threshold elements 23. The output values of the threshold elements 23 as well as the output value of the detector 21 in the parallel circuitry undertaken here are placed in relation to one another in the logic element 25 for the implementation of an OR combination of the discrete values. The output value of the logic element 25 is again filtered in a following contour filter stage 12 via anisotropic low-pass filters 22 and adaptive threshold elements 23 and the output values of the appertaining threshold elements 23 as well as the output signal of the preceding logic element 25 are placed in relationship to one another in a further logic element 25. The output signal of the last logic element 25 in signal flow direction is supplied to the subtraction unit 13 for blanking the noise signal out of the contour signal with the noise part and an amplification and, potentially, limiting of the contour signal ensues in the amplifier unit 15 before an addition of the contour signal to the image signal in the region of the combiner 13.

The modules provided with the same reference numerals in FIG. 11 can, for example, be realized as subprograms that are called in at times that are prescribed by an executive sequencer.

Employment of the method and of the apparatus can occur in a number of applications wherein signal curves allocatable to a reference plane are to be filtered. A typical example is the filtration of images in reproduction technology.

However, many other possible applications are conceivable. In image processing, for example, these can be quality improvement of image information transmitted via telefax equipment or picture telephones; however, it is also possible to subject television pictures, images recorded on video recorders or satellite images to a filtration in order to emphasize noise-infested contours within the images. In general, however, the method and the apparatus can also be employed outside image processing. The problem that the useful signal parts are superimposed by disturbances basically arises everywhere in the evaluation of signal curves allocatable to a surface. As an example, let only the registration of a temperature profile of a surface be recited here. Given parameter constellations that are presented in a parameter space having a larger dimension, it is either possible to respectively subject three-dimensional sub-structures to a filtering or to vectorially implement the processing algorithms described, for example, in FIGS. 11 and 13 such that the parameters to be taken into consideration in the respective operations are arranged in vectors and matrices having a suitable dimensioning.

It would also be conceivable that the output signal 14 is rated, without the further-processing in the stages 15, 16, as contour information free of disturbances and, for example, can be employed for jobs in the field of pattern recognition as an input signal for a unit for feature extraction.

In an embodiment modified in comparison to the illustration of FIG. 1, a distortion-correction characteristic can be arranged at an output of, preferably, one of the contour filter stages 12 for minimizing a potentially occurring residual error. The curve of the distortion-correction characteristic is preferably selected such that the contour signal, after being charged with the distortion-correction characteristic, has a curve that is essentially independent of the curve of the level-dependent signal-to-noise ratio of the input signal. A level-independent signal-to-noise ratio is approximately realized as a result thereof. It is taken into consideration in this functioning that the subtraction unit 13 works like a blanking unit that is controlled by the last contour filter stage 12 in signal flow direction. The signal proceeding into the region of the subtraction unit 13 via the coupling branch 10 is always set to "ZERO" when the signal offered by the last contour filter stage 12 in signal flow direction differs from "ZERO".

Such a distortion-correction characteristic can also be taken into consideration in the embodiment shown in FIG. 3. The distortion-correction characteristic is expediently arranged here in the region of the output of the detector 21. Although various minor changes and modifications might be suggested by those skilled in the art, it will be understood that I wish to include within the scope of the patent warranted hereon all such changes and modifications as reasonably come within my contribution to the art.

I claim:

1. A method for filtering an input signal to provide an overall output signal, comprising the steps of:
   providing the input signal to a first input of an adder whose output is connected to provide said overall output signal, and also providing said input signal to a filter branch providing a filtered signal which is coupled to a second input of said adder;
   frequency filtering the input signal in said filter branch such that signal amplitudes are allocated to a quantized, two-dimensional reference plane to provide a frequency filtered signal;
   feeding said frequency filtered signal to a first input of a subtraction unit whose output provides said filtered signal to said second input of said adder;
   also providing said frequency filtered signal to a contour filter branch having at least one contour filter stage whose output is connected to a second input of said subtraction unit; and
   filtering out at least one component of the frequency filtered signal in said contour filter stage that has an amplitude above a prescribable threshold, the threshold being adaptively adjusted dependent on an amplitude of the frequency filtered signal.

2. A method according to claim 1 wherein said at least one contour filter stage comprises a plurality of contour filter stages and successively repeatedly filtering such that pronounced contours are filtered out first and contours having lower intensity are subsequently filtered out.

3. A method according to claim 1 including the further step of amplifying the signal present at the output of said subtraction unit before input to said second input of said adder.

4. A method according to claim 1 including the steps of providing said at least one contour filter stage with an anisotropic low-pass filter that has a prescribable orientation within said reference plane, and detecting a contour curve in said at least one contour filter stage.

5. A method according to claim 1 including the steps of providing said at least one contour filter stage with a plurality of differently dimensioned stage elements each of which is provided with an anisotropic low-pass filter, and providing the anisotropic low-pass filters with different orientations within the reference plane.

6. A method according to claim 5 wherein said at least one contour filter stage comprises at least two of the stage elements in parallel.

7. A method according to claim 1 including the step of providing at least two of the contour filter stages in chronological succession.

8. A method according to claim 1 wherein said at least one contour filter stage comprises a plurality of contour filter stages in succession and providing each with anisotropic low-pass filters having different low-pass filter lengths.

9. A method according to claim 1 including the step of limiting said filtered signal prior to input at said second input of said adder.

10. A method according to claim 1 including the steps of providing said contour filter stage with at least one contour filter stage element having a threshold element, and implementing an adaptive limitation of the threshold element dependent on a chronologically directly allocated amplitude of the input signal.

11. A method according to claim 1 wherein said at least one contour filter stage comprising a plurality of contour filter stages and adaptively implementing them dependent on an analysis of said input signal.

12. A method according to claim 1 including providing said at least one contour filter stage with a plurality of contour filter stage elements each having an anisotropic low-pass filter, and adaptively defining the anisotropic low-pass filters within said reference plane by an analysis of said input signal.

13. A method according to claim 1 including the step of quenching isolated amplitude values within said reference plane after a subtraction of a noise part in said subtraction unit from a signal input to said subtraction unit containing contour information.

14. A method according to claim 1 wherein said input signal has image information.

15. A method according to claim 14 wherein the input signal is a reproduction technology input signal.

16. A method according to claim 14 wherein said input signal is a telecommunication field technology input signal.

17. A method according to claim 16 wherein said input signal comprises an image signal in telefax communication.

18. A method according to claim 1 wherein said input signal comprises a signal on which image analysis is to be performed.

19. A method according to claim 1 wherein said frequency filtering comprises high-pass filtering.

20. An apparatus for filtering signals, comprising:
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having a plurality of stages for eliminating contour signal parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
said plurality of contour filter stages being provided for filtering contours having differing intensities, and wherein said plurality of contour filter stages are connected in series.

21. An apparatus for filtering signals, comprising.;
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having at least one contour filter stage for eliminating contour signal parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
said at least one contour filter stage having at least two contour filter stage elements each of which comprise an anisotropic low-pass filter and wherein the low-pass filters are differently oriented within said reference plane for locating differently oriented contours.

22. An apparatus for filtering signals, comprising:
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having at least one contour filter stage for eliminating contour signal parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
said at least one contour filter stage having a plurality of contour filter stage elements each of which has an anisotropic low-pass filter and wherein said low-pass filters have a prescribable width of quantization stages as well as a prescribable length of quantization stages.

23. An apparatus for filtering signals, comprising:
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having at least one contour filter stage for eliminating contour signal parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
said contour filter stage comprising an anisotropic low-pass filter connected to a threshold element, and wherein at least one of said threshold element and anisotropic low-pass filter is designed as an algorithm capable of being run on a digital computer.

24. An apparatus for filtering signals, comprising:
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having at least one contour filter stage for eliminating contour signals parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
said at least one contour filter stage comprising a contour filter stage element having an adaptive threshold element for recognition of contour signal parts, said adaptive threshold element being connected for adjustment of its threshold to an adaption element for evaluating an amplitude of said input signal.

25. An apparatus for filtering signals, comprising:
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having at least one contour filter stage for eliminating contour signal parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
said contour filter stage comprising a plurality of contour filter stage elements connected in parallel and supplied to a logic element for combining them with one another via an OR operation.

26. An apparatus for filtering signals, comprising:
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having at least one contour filter stage for eliminating contour signal parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
said frequency filter allocating an amplitude value of zero to a corresponding coordinate of said reference plane for elimination of isolated signal parts.

27. An apparatus for filtering signals, comprising:
a signal input connecting to a first input of an adder whose output connects to a signal output;
said signal input also connecting to a frequency filter having at least one lower limit frequency and whose output connects to a notch diplexer;
said frequency filter allocating signal amplitudes to a quantized, two-dimensional reference plane;
said notch diplexer comprising a subtraction unit having a first input at which an output of said frequency filter connects and a contour filter branch having at least one contour filter stage for eliminating contour signal parts, an output of said contour filter branch connecting to a second input of said subtraction unit, said subtraction unit subtracting an output signal of said contour filter branch from an output of said frequency filter for noise elimination;
an output of said subtraction unit connecting to a second input of said adder; and
a selector for elimination of isolated signal parts, said selector checking at least those amplitude values that are allocated to a working coordinate in said reference plane as neighboring coordinates to see whether their amplitude value is equal to zero and an amplitude value of the working coordinate is set to zero in case of a complete locating of amplitude values equal to zero.

28. A method for filtering an input signal to provide an overall output signal, comprising the steps of:
providing the input signal to a first input of an adder whose output is connected to an output, and also providing said input signal to a filter branch providing a filtered signal which is coupled to a second input of said adder;

frequency filtering the input signal in said filter branch such that signal amplitudes are allocated to a quantized, two-dimensional reference plane to provide a frequency filtered signal;

feeding said frequency filtered signal to a first input of a subtraction unit whose output provides said filtered signal to said second input of said adder;

also providing said frequency filtered signal to a contour filter branch having at least one contour filter stage whose output is connected to a second input of said subtraction unit; and filtering out at least one component of the frequency filtered signal in said contour filter stage that has an amplitude above a prescribable threshold, the threshold being adaptively adjusted.

* * * * *